(12) United States Patent
Zubeck (10) Patent No.: US 7,621,262 B2
(45) Date of Patent: Nov. 24, 2009

(54) HYBRID THERMAL ENERGY CONVERSION FOR HCCI HEATED INTAKE CHARGE SYSTEM

(75) Inventor: Michael W. Zubeck, LaSalle, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 11/747,097

(22) Filed: May 10, 2007

(65) Prior Publication Data

US 2008/0276913 A1 Nov. 13, 2008

(51) Int. Cl.
*F02B 29/00* (2006.01)
*F02D 41/00* (2006.01)
(52) U.S. Cl. .................................... 123/543
(58) Field of Classification Search .............. 123/549, 123/543, 556
See application file for complete search history.

(56) References Cited

U.S. PATENT DOCUMENTS

| 4,951,769 | A | 8/1990 | Kawamura |
| 6,018,694 | A | 1/2000 | Egami et al. |
| 6,295,973 | B1 | 10/2001 | Yang |
| 6,698,389 | B2 * | 3/2004 | Andrews et al. ......... 123/41.31 |
| 6,983,730 | B2 | 1/2006 | Kuzuyama |
| 7,104,349 | B2 | 9/2006 | Gray, Jr. |
| 2005/0173169 | A1 | 8/2005 | Gray, Jr. |
| 2007/0212598 | A1 * | 9/2007 | Iida et al. ...................... 429/62 |
| 2008/0275600 | A1 * | 11/2008 | Rask et al. .................... 701/22 |

FOREIGN PATENT DOCUMENTS

| EP | 1108572 | | 6/2001 |
| JP | 2000265910 | * | 6/2000 |
| JP | 2000265910 | | 9/2000 |

\* cited by examiner

*Primary Examiner*—Michael Cuff
*Assistant Examiner*—Hung Q Nguyen
(74) *Attorney, Agent, or Firm*—Allan J. Lippa; Alleman Hall McCoy Russell & Tuttle LLP (57) ABSTRACT

A method of operating an internal combustion engine coupled in a hybrid powertrain, the method comprising of extracting waste energy from a component of an electrical power system of the hybrid powertrain, and adjusting intake air temperature during homogeneous charge compression ignition operation of the engine by using said extracted waste energy.

12 Claims, 11 Drawing Sheets

HYBRID THERMAL ENERGY CONVERSION FOR HCCI HEATED INTAKE CHARGE SYSTEM

BACKGROUND AND SUMMARY

Engines may operate with various forms of combustion, one of which is Homogeneous Charge Compression Ignition (HCCI), where an air and fuel mixture achieves a temperature where autoignition occurs without requiring a spark from a sparking device. Combustion timing of HCCI engines may be controlled by regulation of the compression temperature of the charge, which in turn may be controlled by regulating the intake charge temperature (temperature of intake charge just prior to compression).

Various heat sources have been used to heat the charge as part of HCCI combustion control strategy, for example, heat generated from turbo charging the intake air, engine waste heat circulated by engine coolant, and/or waste heat harvested from the hot exhaust. However, the inventor herein has recognized that under certain circumstances, the above heat sources may be unavailable and/or unable to provide sufficient heat or sufficiently precise temperature control. For example, during engine cold start or idle, or when the engine is operated to charge the battery while the vehicle is parked, sufficient heat may be unavailable from the exhaust and/or the engine to heat intake air/charge. This may be especially true in hybrid vehicle configurations, where the reduced engine size and increased engine efficiency in HCCI-electric hybrid engines further decrease thermal energy availability for heating the intake charge.

While burners and heaters have been used to provide the additional heating needed for the intake charge (see, for example, U.S. Pat. No. 6,295,973 which describes an electrical heater installed at the intake air port for heating the intake air), such an approach may consume electricity and reduce fuel efficiency.

Applicants have thus recognized that the above issues may be addressed by harvesting various additional thermal energy sources to heat and control the temperature of the intake charge through one or more heat exchangers. For example, it may be possible to harvest heat generated by various components of an electrical power system of a HCCI-electric hybrid vehicle power train, such as inverter, rectifier, battery, and a regenerative braking system. Further, this approach may be especially suited to plug-in hybrid vehicles, for which the electrical power system may include an external plug-in.

As another example, excess electric power generated by a HCCI-electric hybrid vehicle that cannot be utilized for charging energy storage, or otherwise utilized, may also be used to heat the intake charge. In one embodiment, excess electric energy generated by the engine, and/or by regenerative braking system from regenerative braking when the battery is fully charged, or under high battery temperatures, and/or during excessive charging rates may be used to control temperature and heat the intake charge for HCCI combustion.

By providing a thermal management system for a HCCI-electric engine that harvests various sources of thermal energy and/or excessive or waste electric power, it may be possible to provide the additional heating and more accurate intake charge temperature control with reduced impact on fuel economy. In particular, by providing a thermal management system for a hybrid HCCI-electric engine that utilize various thermal energy and/or electrical power, it may be possible to operate the HCCI engine efficiently, even under conditions such as when the engine is used to charge the battery while the vehicle is parked.

DETAILED DESCRIPTION

Figure 1:
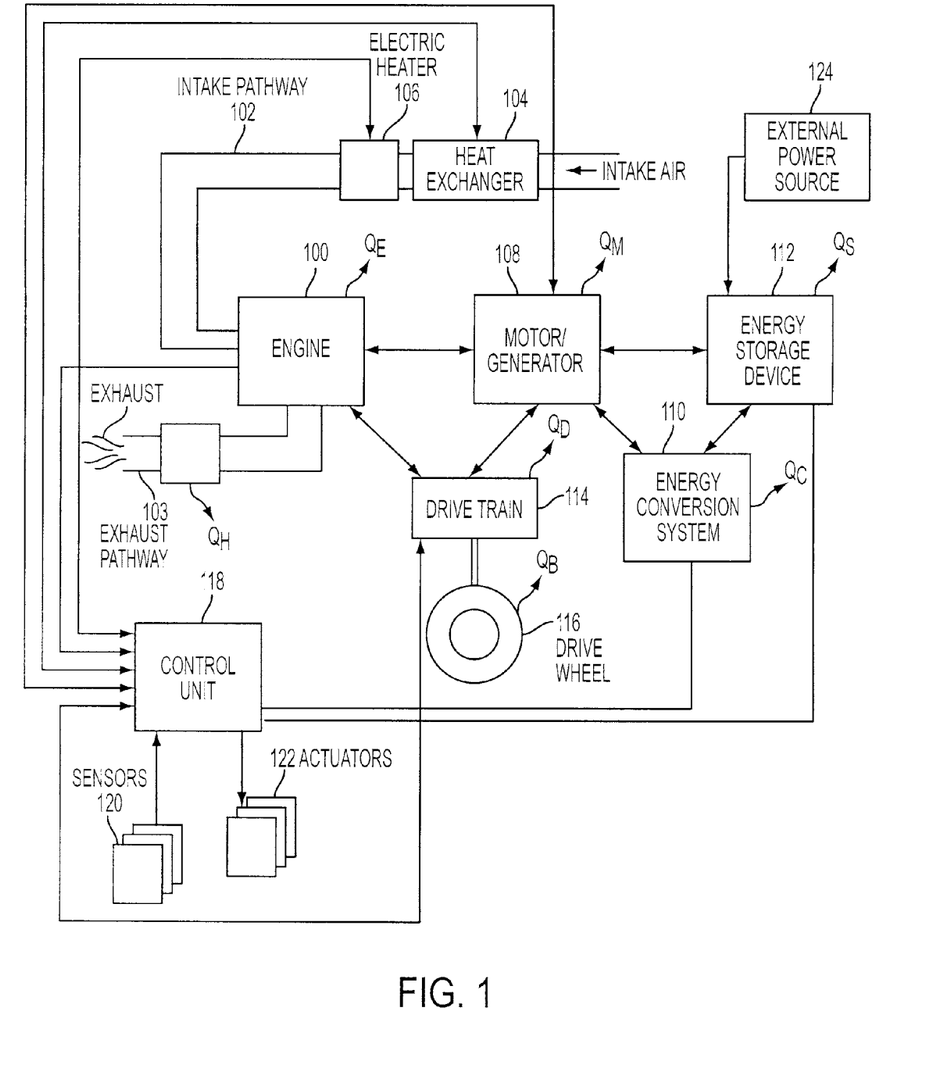
FIG. 1 is a diagram illustrating an intake thermal management system for a HCCI-electric hybrid engine.

FIG. 1 is a block diagram illustrating an example intake thermal management system for a HCCI engine, which may include an engine 100 with an intake pathway 102 and an exhaust pathway 103, a heat exchanger 104 that harvests vehicle thermal energy to heat intake air, and an electric heater 106. The intake thermal management system may include an electric power system for a hybrid power train (not labeled), which may include a motor/generator 108 for generating electrical power from engine torque as part of an engine electrical power generating system (not all shown) and/or regenerative braking as part of an regenerative braking system (not all shown), an energy conversion system 110, an energy storage device 112. The intake thermal management system may also include a drive train 114 and a set of drive wheels 116. The energy storage device 112 may be coupled to an external power source 124 for supplying power used for charging the energy storage device. The intake thermal management system may further include a control unit 118. The control unit 118 may receive signal inputs from various sensors 120 and control vehicle operation through various actuators 122.

The engine 100 receives intake air through the intake pathway 102 and exhaust through the exhaust pathway 103. The intake air may be compressed by turbochargers (not shown) prior to entering the engine and the turbocharger may be coupled to an exhaust powered by a compressor (not shown). The heat exchanger 104 and the electric heater 106 are positioned in the intake pathway 102 in this example for heating the intake air. The engine 100 may be directly coupled to the drive train 114, or may be indirectly coupled to the drive train 114 through the motor/generator 108. The drive train 114 is coupled to the drive wheel 116. The motor/generator 108 may be directly coupled to the energy storage device 112, or may be indirectly coupled to the energy storage device 112 through the energy conversion system 110.

The heat exchanger 104 and the electric heater 106 may heat the intake air in the intake pathway 102 utilizing various sources of vehicle waste energy. For example, the heat exchanger 104 may utilize various sources of waste heat, such as those generated by the engine ($Q_E$), the hot engine exhaust ($Q_H$), the motor/generator ($Q_M$), the energy conversion system ($Q_C$), the energy storage device ($Q_S$), the drive train ($Q_D$), and the brake system ($Q_B$) such as the generator used for regenerative braking, to heat and/or control temperature of intake air during an HCCI combustion mode. Note that these are example sources of vehicle waste energy that may be harvested; however, still further sources may also be used if desired. For example, the thermal energy of other semiconductor containing components may also be harvested by the heat exchanger 104 to heat the intake air/charge.

In one example, the electric heater 106 may use excess electric power of the motor/generator 108 that cannot be used for charging the energy storage device 112 to heat the intake air. The excess electric power may be generated by the engine 100 or by a regenerative engine braking system (not shown).

Various engine configurations may be possible. Although an HCCI engine is provided in this example, the engine 100 may be one or more various types of internal combustion engines that are capable of performing charge compression combustions and where heating up the intake air/charge may be necessary for controlling engine combustion, for example homogeneous charge compression ignition (HCCI) or non-homogeneous charge compression such as stratified charge compression ignition (SCCI).

In addition to charge compression ignition combustion, the engine 100 may also be capable of other combustion modes, for example the engine 100 may also include a spark ignition system that allows the engine to perform spark ignition (SI) combustion or SI assisted HCCI combustion in addition to HCCI combustion.

Individual cylinders of the engine 100 may operate in different combustion modes at a given time. Furthermore, individual cylinders may be capable of transitioning among different combustion modes from time to time, for example from SI combustion to HCCI combustion and then back to SI combustion.

The engine may contain a single cylinder or multiple cylinders. The cylinders of the engine may be arranged in various configurations. For example, the cylinders may be arranged in a line as in in-line engines, arranged in a v configuration as in v engines, arranged in w configuration as in w engines, arranged into two opposing banks of cylinders as in flat engines, or arranged in a combination of engine configurations.

The engine 100 may be capable of cylinder valve and/or fuel deactivation. To be more specific, individual cylinders may be individually or separately activated or deactivated depending on, for example, driver input, engine controller input, engine operating condition, and/or ambient condition.

Additionally, the internal combustion engine may use different stroke cycles, for example it may use a two-stroke or a four-stroke cycle or a combination of different stroke cycles.

The engine 100 may also burn various types of fuels, such as diesel, vegetable oil, propane, gasoline, or a combination of different fuels.

Various configurations of intake and exhaust pathways are possible. Although only one intake pathway and one exhaust pathway are shown, multiple intake pathways or multiple exhaust pathways may be possible.

The intake pathway 102 may include one or more cooling passages, heating passages, bypasses, and EGR recirculation passages, and/or cylinder intake passages. The intake pathway may contain one or more cooling devices (not shown) such as intercoolers for cooling the intake air or EGR coolers for cooling the re-circulated exhaust gas. The intake pathway 102 may also contain various valves, controls, or mechanisms (not shown) for controlling the intake air flow. For example, if heating is used for the intake air, more or all of the intake air may be diverted through the heat exchanger 104 and the electric heater 106; and if cooling is used for the intake air, more or all of the intake air may be diverted through one or more of the cooling devices; and if no heating or cooling is used, the intake air may be diverted through one or more bypasses that allow the intake air to bypass the heat exchanger 104, the electric heater 106, and the cooling devices (not shown).

The exhaust pathway 103 may include one or more passages, for example passages for re-circulating EGR, passages that divert all or part of the exhaust to one or more heat exchangers, such as heat exchangers for heating the intake air/charge. The exhaust pathway may contain one or more cooling devices (not shown) such as EGR coolers for cooling the re-circulated exhaust gas. The exhaust pathway 103 may also include various valves, controls, or mechanisms (not shown) for controlling the exhaust flow. For example, control valves may be provided to control the amount and timing of the exhaust re-circulation to control the amount and timing of exhaust diversion to various heat exchangers.

Similarly, although one electric heater 106 is shown, multiple electric heaters may be provided. The electric heater 106 may also be positioned at various locations along the intake pathway 102, and it may also be in the engine 100, such as in cylinder walls.

Referring now to the heat exchanger 104, although one heat exchanger 104 is shown, multiple heat exchangers may be provided. Although the heat exchange is located upstream of the electric heater 106 in this example, it may also be located down stream of the electric heater 106. The heat exchanger 104 may be of various types that are capable of harvesting vehicle waste energy, for example air-to-air heat exchangers, liquid-to-air heat exchangers, or a combination of above. The heat exchanger may contain one or more coolant loops for harvesting different sources of waste heat of the vehicle, for example, a coolant loop may be used to harvest the waste heat of the engine and the engine hot exhaust, another coolant loop may be used to harvest the waste heat of the energy storage device, energy conversion system, and electric motor/generator, and yet another coolant loop may be used to harvest the waste heat of the drive system and the brake system. In addition, the heat exchanger may be arranged in various relations with respect to each other; for example in parallel, in series, or in a combination of parallel and series with respect to each other. The heat exchanger may also be located at one or more of various positions, for example along the intake pathway and/or inside the engine wall to effect heating of the intake air/charge.

Although one electric heater 106 is provided and the electric heater 106 is located downstream of the heat exchanger 104 in this example, in other examples, no electric heater may be provided or multiple electric heaters positioned at various locations along the intake pathway and/or on individual engine cylinder walls may be provided. For example, in addition to an electric heater positioned in the intake pathway and downstream of the heat exchanger 104, multiple electric heaters may be positioned in each engine cylinder wall to control cylinder charge temperature. In another example, individual electric heaters may be positioned in the intake pathway after it branches off to feed individual cylinders.

Although the heat exchanger 104 and the electric heater 106 are separate units in this example, it may be possible for the heat exchanger 104 and the electric heater 106 to be partially or completely integrated, in other words they may be combined into one integrated unit.

The motor/generator 108 may function as both an electric motor and a generator, and in this embodiment the motor/generator powers the drive train 114 as an electric motor and generates electric power using the mechanical energy generated by the engine and the regenerative braking. However, it may be possible in other examples that one or multiple individual electric motors and generators may be used to serve the function of the motor/generator 108. For example, the engine 100 may be coupled to a separate generator, which generates electricity using engine kinetic energy. The generator in turn may be coupled to an inverter, which converts the generated AC current to DC current. The inverter may be then coupled to an electric motor, which in turn may be coupled to and drives the drive train 114.

The energy conversion system 110 may include various components, such as one or multiple inverters, rectifiers, and/or DC/DC converters.

The energy storage device 112 may include one or more batteries (not shown). The batteries may be connected in various ways, such as series, parallel, or a combination of series and parallel.

The energy storage device 112 may also include various sensors, such as battery sensors (not shown). For example, each battery of the energy storage device may include a charge sensor (not shown) for sensing the charge state of the battery and may also include a temperature sensor for sensing the temperature of the battery.

The energy storage device 112 may also include various control mechanisms for controlling the charging of the energy storage device 112 and/or for diverting the energy stored in the energy storage device 112 for powering various electronic components of the vehicle, and in some examples, in accordance with the vehicle operating conditions, such as the engine operating conditions, the throttle angles, and/or the charge of the energy storage device 112. For example, the various control mechanisms may distribute electric power among the individual batteries in accordance with the charge state of each battery. The various control mechanisms may also divert excess energy that may not be used to charge the energy storage device for other uses based on the charge state of the energy storage device. Other uses include but are not limited to powering the electric heaters for heating the intake air/charge or powering heaters for heating passenger compartment.

The external power source 124 may be any suitable external power source, for example, it may be an electric outlet, or it may be an electrified rail, plate or overhead wires on the highway via an attached conducting wheel or other similar mechanism.

The hybrid propulsion system may utilize a hydraulic system rather than electrical system for converting and storing energy, for example, the energy conversion system may be configured as a hydraulic pump supplying hydraulic fluid pressure to the energy storage device, wherein the energy storage device may include a pressure vessel for storing the pressurized hydraulic fluid. Further, the pressure vessel may be configured to supply pressurized hydraulic fluid to a hydraulic traction motor. In such a hybrid propulsion system, it may be possible that the excess energy from, for example, regenerative engine braking that cannot be used to charge the energy storage device, may be converted to electric power to power the electric heater 106.

The drive train 116 may include various vehicle components that connect the engine and/or the electric motor to the driving wheels. It may include clutches, transmissions, drive shafts, differential, and axels.

Although one control unit is shown, multiple control units may be provided. The control unit 118 may comprise a microcomputer provided with a central processing unit (CPU), a read-only memory (ROM), a random access memory (RAM) and an input/output interface (I/O interface). The control unit 118 may comprise a plurality of microcomputers. The control unit 118 may be an engine control unit, powertrain control unit, combinations of various control units, or part of a control system with one or more control units.

In this example, the control unit 118 may be coupled to the engine 100, the motor/generator 108, the energy storage device 112, the energy conversion system 110, the heat exchanger 104, and the electric heaters 106. In this example the control unit 118 may also be coupled to various control valves (not shown) that control the intake air flow.

The control unit 118 may further receive signal inputs from various other sensors 120, such as sensors for detecting engine speed, vehicle speed, accelerator pedal position, temperature, pressure, status of the energy conversion system 110, and the charge and temperature status of individual batteries in the energy storage system 112. Based on these sensor signals, the control unit 118 may control the operation of the vehicle through the various actuators 122. For example, the control unit 118 may control the operation of the engine, the energy conversion system, the energy storage system, the electric heater, and the heat exchanger through the various actuators 122 based on the sensed signals from the various signals 120.

In one example, the heat exchanger 104 and the electric heater may operate in coordination to control the intake charge temperature. The coordination may be carried out by a control unit such as the control unit 118. In some examples where the intake thermal management system includes multiple heat exchangers and/or multiple electric heaters, the control unit 118 may coordinate the operation of a plurality of (e.g., all) heat exchangers and electric heaters to achieve a target intake air/charge temperature (and further coordination with other temperature controls may be used, such as with variable valve timing, variable valve operation, exhaust gas recirculation, etc.). The control unit 118 may determine the target intake air/charge temperature based on the vehicle operating conditions, such as engine combustion modes (whether it is SI combustion, HCCI combustion, etc). The control unit 118 may also determine engine combustion modes based on various inputs, such as driver inputs and engine controller inputs.

In some examples, the control unit 118 may coordinate the flow of the excess electric power generated by various sources, such as by the engine and/or by the regenerative braking. For example, if the battery is not fully charged, the excess electric power generated by the engine and/or by the regenerative braking may be diverted first to charge the battery; on the other hand, if the battery is fully charged, the excess electric power may be diverted to power the electric heater and/or other electrical equipments of the vehicle, such heaters for heating seats or passenger compartment air.

In some examples, the control unit 118 may coordinate the various electrical energy sources for powering the electric heater 106. For example, if there is excess electric power available that cannot be used to charge the energy storage device 112, that excess electric power may be used first to power the electric heater 106; on the other hand if there is no or not enough excess electric power available that cannot be used to charge the energy storage device 112, other electric power sources, such as batteries, may be used to power the electric heater 106.

Figure 2:
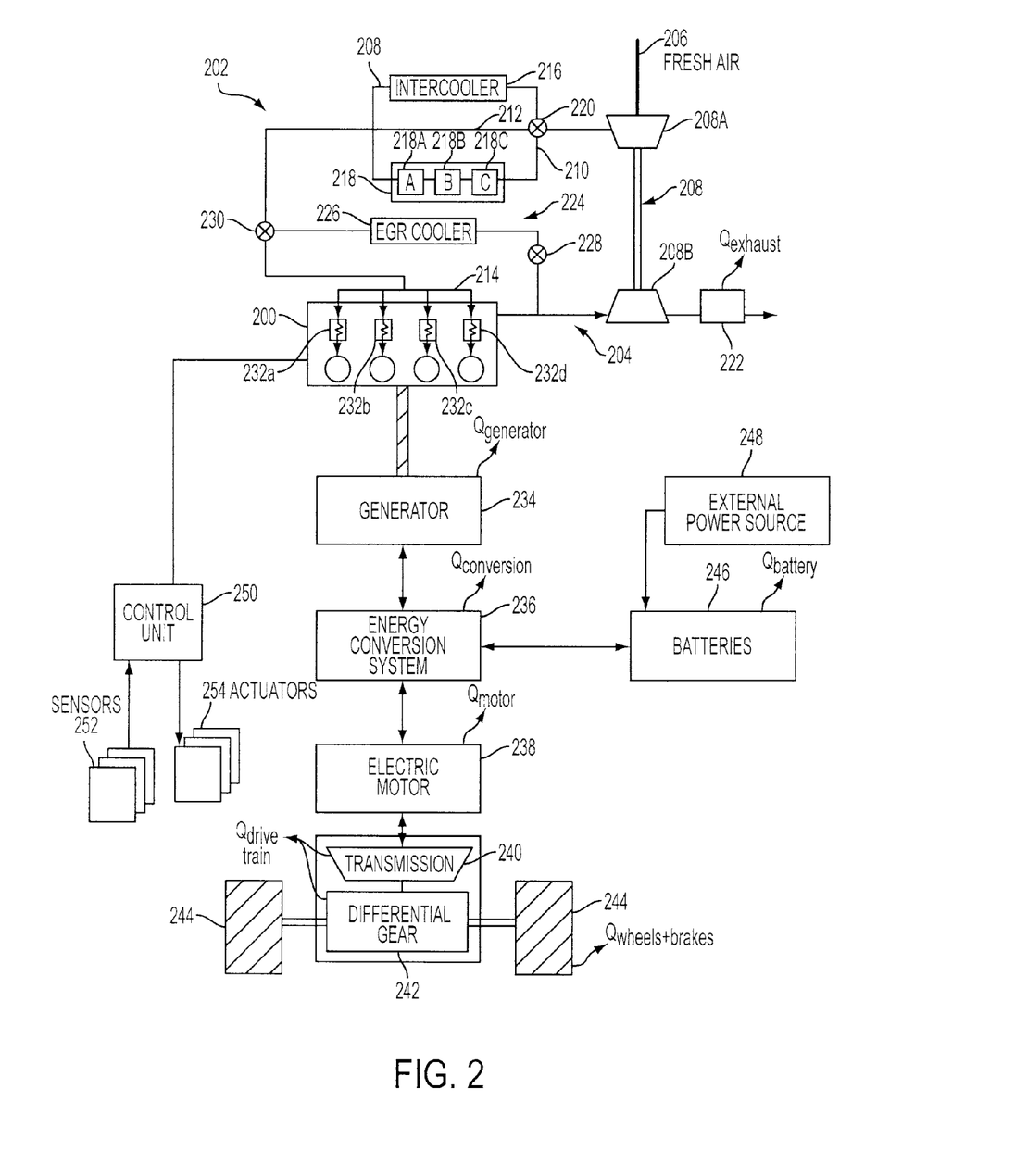
FIG. 2 is a diagram illustrating another example intake thermal management system for a HCCI-electric hybrid engine.

FIG. 2 is a detailed example of FIG. 1. The various alternative described in FIG. 1 may be further applied to FIG. 2 and the remaining Figs.

The system in FIG. 2 is shown to include a HCCI engine 200, an intake pathway 202, and an exhaust pathway 204.

The intake pathway 202 may include a fresh air inlet 206, and a turbocharger 204 (including a compressor 204A and a turbine 204B) for compressing the intake air. The intake pathway 202 may include several parallel passages: a cooling passage 208, a heating passage 210, and a bypass 212. The intake pathway 206 may also include branched cylinder intake passages 214. The cooling passage 208 may include an intercooler 216 for cooling the intake air. The heating passage 210 may include an integrated heat exchanger 218 that may contain subunits 218A, 218B, and 218C. The subunit 218C may be an exhaust heat exchanger that harvests waste heat from the exhaust, for example through a heat exchanger 222 positioned in the exhaust pathway 204. The subunit 218B may be an engine coolant heat exchanger that harvests engine waste heat. Subunit 218A may be a battery and energy conversion system heat exchanger for harvesting waste heat from the battery and the energy conversion system. The intake pathway may further include a control valve 220 for controlling the flow of the intake air through the cooling passage 208, the heating passage 210 and the bypass 212.

The exhaust pathway 204 may include the heat exchanger 222 for harvesting the exhaust waste heat to satisfy various heating requirements, for example for heating the intake air. An exhaust gas recirculation (EGR) passage 224 couples the exhaust pathway 204 to the intake pathway, and the EGR passage includes an EGR cooler 226 for cooling the recirculated exhaust. The EGR passage 224 further includes a control valve 228 for regulating the amount of EGR flow and a mixing valve 230 for mixing the intake fresh air and the recirculated exhaust.

Fresh air enters the intake pathway 202 through the fresh air inlet 206 and is then compressed by the compressor 208A. The compressed intake air may go down one or more of three alternative passages: the cooling passage 208, the heating passage 210, and/or the bypass 212. The valve 220 controls the amount of air flowing down the three alternative passages according to the temperature requirement for the intake air/charge. The intake air is then recombined into a single stream before being mixed with re-circulated exhaust of the EGR passage 224 at a mixing valve 230. The air mixture then travels down a branched cylinder intake passages 214 to feed individual engine cylinders.

The system may include electric heaters 232 positioned in cylinder intake passages 214 leading to individual cylinder for heating the intake charge prior to it entering the engine cylinders.

The system may further include an electrical power system for a hybrid drive train, which includes a generator 234 for generating electrical power from engine torque as a part of an engine electrical power generating system, an energy conversion system 236, electric motor 238 for powering a drive train, and for generating electrical power from regenerative braking as a part of a regenerative braking system (not all shown), batteries 246, and an external electric power source 248 for charging the batteries 246. The system may further include a transmission 240, differential gear 242, and a set of driving wheels 244.

Various sources of thermal energy may be utilized by the integrated heat exchanger 218 to heat the in take air. The various thermal energy may include heat produced for example by the generator ($Q_{generator}$), the energy conversion system 236 ($Q_{conversion}$), the electric motor 238 ($Q_{motor}$), the batteries 246 ($Q_{battery}$), the drive wheels 244 ($Q_{wheels+brakes}$), and the drive train 240 & 242 ($Q_{drive}$). Various sources of electrical energy, including waste electrical energy that cannot be used to operate the vehicle or charge the batteries, may be utilized by the electrical heaters 232a-d to heat the intake air, for example, waste electrical energy generated by the engine 200, waste electrical energy generated by a regenerative braking system, and waste electrical energy from an external plug-in.

The system may further include a control unit 250. The control unit 250 may receive signal inputs from various sensors 252 and may control the operation of the thermal management system and other vehicle operation through various actuators 254, such as the operation of the engine, batteries, energy conversion system, intercoolers, integrated heat exchanger, electric heaters, and valves controlling the flow of the intake air/charge. The control unit 250 may control the operation of the valves (connection between the control unit and the valves are not shown) to control the amount and temperature of fresh air and EGR to be introduced into the engine cylinders depending on the vehicle operating conditions.

The engine 200 may be one or more various types of internal combustion engines that are capable of performing charge compression combustions. For example, it may contain a single or multiple cylinders, the cylinders may be arranged in various configurations, individual cylinders may operate in various different combustion modes at a given time and may transition among different combustion modes, the engine may be capable of cylinder valve and/or fuel deactivation, and/or the engine may also use various or a combination of various stroke cycles and may burn various types of fuels.

Various configurations of intake pathway 202 and exhaust pathway 204 may be possible. The intake pathway and the exhaust pathway may include one or more various types of sensors and/or actuators.

The turbocharger 208 may be of various types of turbochargers, for example, it may be a fixed geometry turbocharger or it may be a variable geometry turbocharger. Further, it may be a variable nozzle turbocharger or include a bypass waste gate. Each turbocharger includes a least a turbine and a compressor. The engine exhaust drives the turbine (not shown), which in turn drives the compressor (not shown), which in turn compresses the engine intake air (not shown). The number and the size of the turbocharger may vary from vehicle to vehicle. Although only one turbocharger 204 is shown for the sake of simplicity, the thermal management system may contain no or multiple turbochargers that are arranged in series or in parallel in relation to each other or in a combination of series and parallel in relation to each other.

Intercooler 216 and the EGR cooler 226 may be one or more various types of heat exchangers, such as liquid-to-liquid and air-to-liquid heat exchangers. The intercooler and the EGR cooler may be cooled by vehicle ram air, cooling fan, and/or an active cooling device such as a condenser.

The control valves 220 and 228, and the mixing valve 230, may include one or more suitable valves, such as needle valves, butterfly valves, ball valves, globe valves, angle globe valves, and/or gate valves; and it may be operated by one or more suitable actuators, such as electric solenoid actuators, pneumatic actuators, hydraulic actuators, and/or electric motor driven actuators.

Although one electric heater per cylinder is provided (232a-d), multiple electric heaters may be possible and they may be positioned at various positions along the intake pathway 202 and/or in the engine cylinders, such as the cylinder walls.

Although one integrated heat exchanger 218 is provided in this example, multiple heat exchangers may be provided. The heat exchanger(s) may be positioned at various locations along the intake pathway 202, may be upstream and/or down stream of one or more of the electric heaters 232a-d, and/or may be arranged in various relations with respect to each other. The heat exchanger may be of various types of heat exchangers and may contain one or more coolant loops for harvesting various sources of vehicle thermal energy. The heat exchanger may be integrated, may coordinate harvesting of the various sources of vehicle thermal energy, may coordinate the operation of its subunits (e.g., individual heat exchanger), may coordinate the operation of various coolant loops supplying heat to the heat exchanger, and/or it may be integrated or coordinated with the electric heaters (e.g., 232a-d).

Although one generator (234) and one electric motor (238) are provided, multiple generators and/or multiple electric motors may be provided. It may also be possible for one generator/electric motor to serve the function of both the generator and the electric motor.

Although the engine 200 is arranged in series with respect to the generator 234 and the electric motor 238 in this example, in other examples, the engine may be arranged in parallel or in a combination of parallel and series with respect to one or multiple electric motor(s).

Although one electric motor 238 is the only source for powering the drive wheels 224 through the drive train (transmission 240 and differential gear 242) in this example, in other examples, multiple electric motors, one or more generators, and/or one or more engines may be used to power the drive wheels.

The energy conversion system 236 and the batteries 246 may include various components, sensors, actuators, and/or control mechanisms.

The external power source 248 may be any suitable external power source.

The transmission 240 may be one or more of various type of transmission, such as manual transmission, automatic transmission which, semi-automatic transmission, continuous variable transmission (CVT), or a combination above.

The control unit 250 may be one or more various types of control units, such as engine control unit. The control unit may receive inputs through various sensors 252 and/or may control the operation of the vehicle through various actuators 254 (e.g., fuel injection actuator, spark ignition actuator, throttle valve actuator, etc). The control unit may coordinate the operation of one or more units of the integrated heat exchanger and the electric heaters 232a-d in controlling the intake air/charge temperature. The control unit may also coordinate the flow of electric power generated by various sources. The control unit may also control the operation of various valves and actuators (e.g., 220, 228, and 230).

Figure 3:
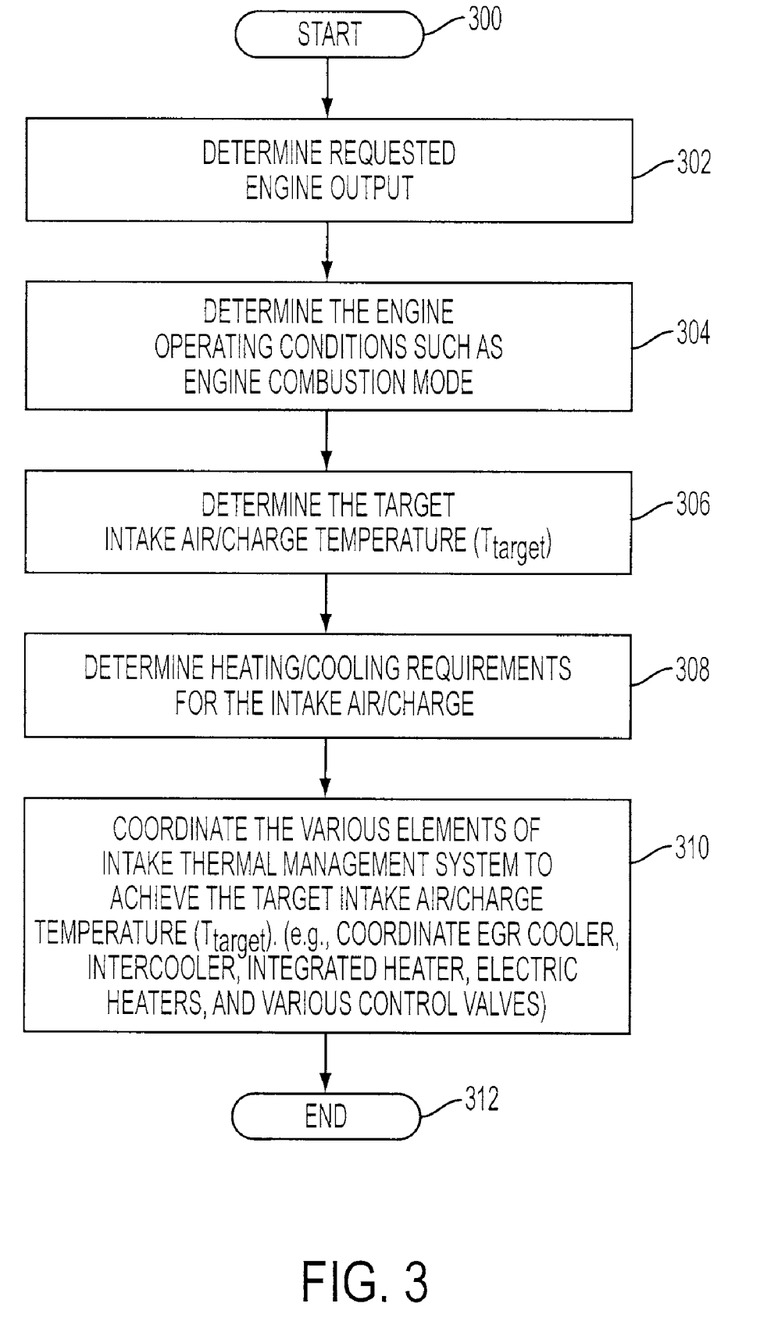
FIG. 3 is a high level flowchart showing an example routine for controlling intake charge temperature based on engine operating conditions.

FIG. 3, 4, 6, 7 show example routines for intake air/charge temperature control by an intake thermal management system as exemplified by FIGS. 1 and 2. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated steps or functions may be repeatedly performed depending on the particular strategy being used. Further, the described steps may graphically represent code to be programmed into the computer readable storage medium in a control unit (e.g. 118 of FIG. 1 and 240 of FIG. 2) and implemented by the control unit.

FIG. 3 is an example routine for intake air/charge temperature control by an intake thermal management system.

A requested engine output is first determined at 302. The requested engine output may include but is not limited to a requested torque, speed and/or power, and may be determined by or correlated to pedal positions, other vehicle operating conditions, or inputs from the driver and/or a control unit that controls engine operation. The request may be initiated by the driver and/or a control unit such as the control unit 118 & 250.

Figure 5:
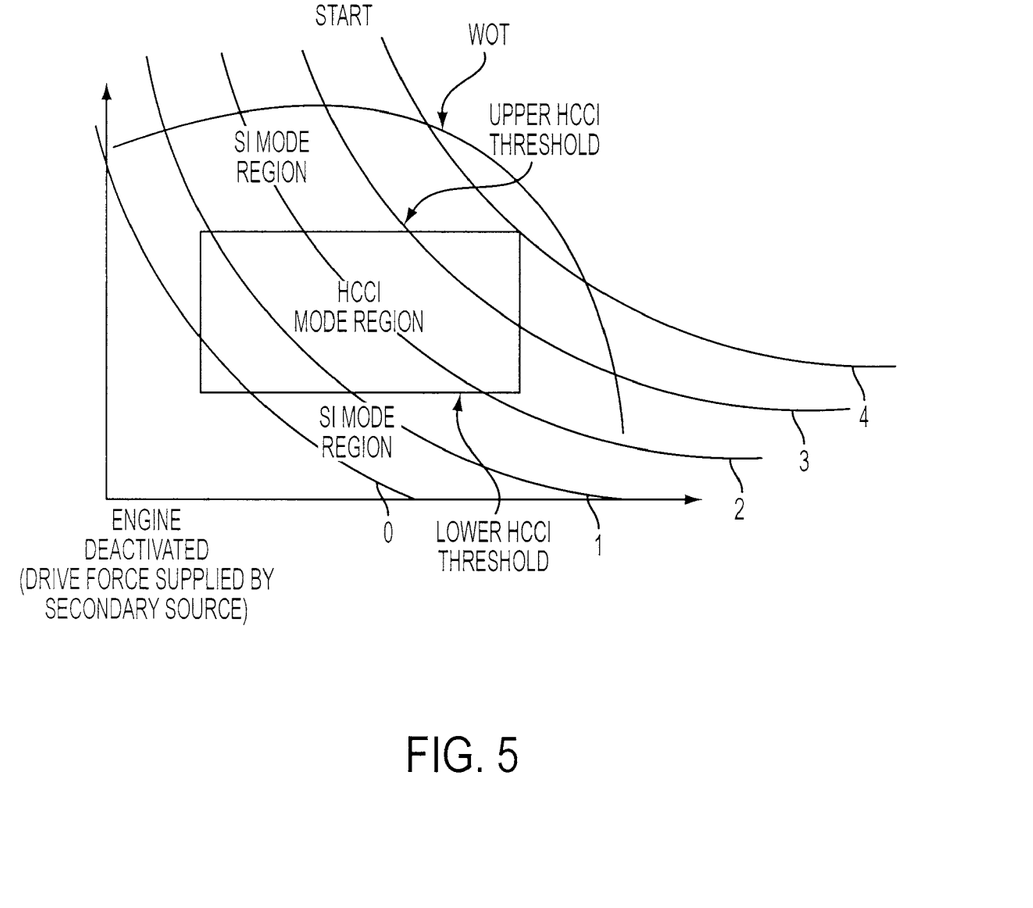
FIG. 5 is an example engine map for an engine capable of HCCI, SI, and VD engine modes.

Next, engine operating conditions, in particular engine combustion mode, are determined at 304. Engine (e.g., 100, 200) may be operating in one of various modes, such as but not limited to spark ignition (SI) mode, homogeneous charge compression ignition (HCCI) mode, stratified charge compression ignition (SCCI), variable displacement mode, deactivated mode, or a combination of the above modes. Each cylinder may operate in a different mode and each cylinder may transition from one engine mode to another. For example in a six-cylinder engine, at a particular time, two cylinders may be deactivated, two cylinders may be operating in SI mode, and the other two may be operating in HCCI mode. The engine operating mode may be determined based on various vehicle operating conditions, ambient conditions, and/or driver input. In some examples, the engine operating mode may be provided by an engine map (as illustrated by FIG. 5). For example, when the vehicle is operating at a low load and/or speed, all engine cylinders may be deactivated and drive force may be supplied by a secondary source such as a battery. As the engine load and/or speed increase, some engine cylinders may operate in SI mode while the rest of the cylinders remain deactivated. As the engine load and/or speed further increase, the engine may transition from SI mode to HCCI mode, and/or one or more engine cylinders may be activated. As the engine load further increases, the engine may again transition back to SI mode.

Target intake air/charge temperature is determined based on the engine operating conditions at 306. For example, in SI mode, lower intake air/charge temperature may be used to reduce engine knock. In HCCI mode, higher intake air/charge temperature may be used to achieve auto-ignition and tighter intake air/charge temperature control may be used to control auto-ignition timing. In deactivated mode, no intake air/charge temperature control may be used. In some examples, the target intake air/charge temperature may be different for each engine cylinder. For example, one cylinder is operating in SI mode and may require a lower intake air/charge temperature, another cylinder is operating in HCCI mode and may require a higher intake air/charge temperature, while a third cylinder is deactivated and no intake air/charge temperature control may be required.

Next, heating or cooling requirements for the intake air/charge, which include the amount of heat or cooling required to heat the intake air/charge, are determined at 308. The heating requirements may be determined based on factors such as the target intake air/charge temperature, ambient conditions, hot exhaust recirculation, and intake pathway configurations. For example, the heating or cooling requirements may increase as the difference between the target temperature of the intake air/charge and the temperature of the intake fresh air increases, and no heating or cooing may be required if the engine is deactivated. Different cylinders may have different heating/cooling requirements, and this may occur even when the cylinders have the same target intake air/charge temperature because of their different spatial arrangements.

Next, various elements of the intake thermal management system are controlled and/or coordinated to achieve the target intake air/charge temperature at 310. The various elements include but are not limited to EGR cooler, intercooler, integrated heat exchanger, electric heaters, and various control valves for controlling the intake air/charge flow. They may also include various controllers, valves, and/or actuators for controlling thermal energy harvesting to be used by the integrated heat exchanger for heating the intake air/charge and for diverting various electric power sources to be used by the electric heaters to heat the intake air. Further details of the components of FIG. 3 are described below.

Figure 4A:
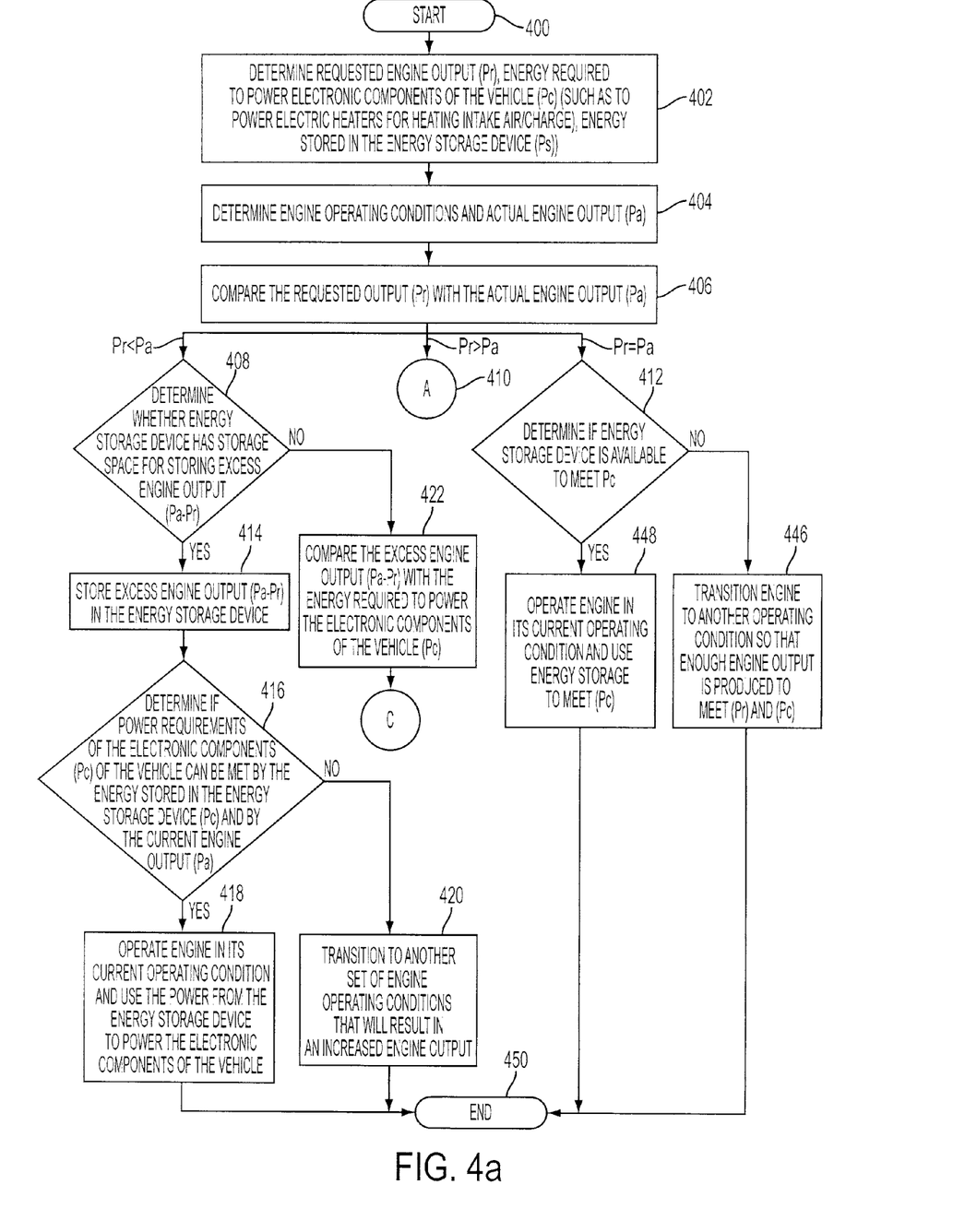
FIG. 4 is a flowchart showing an example routine for coordinating engine, battery, and electric heater operations.
Figure 4B:
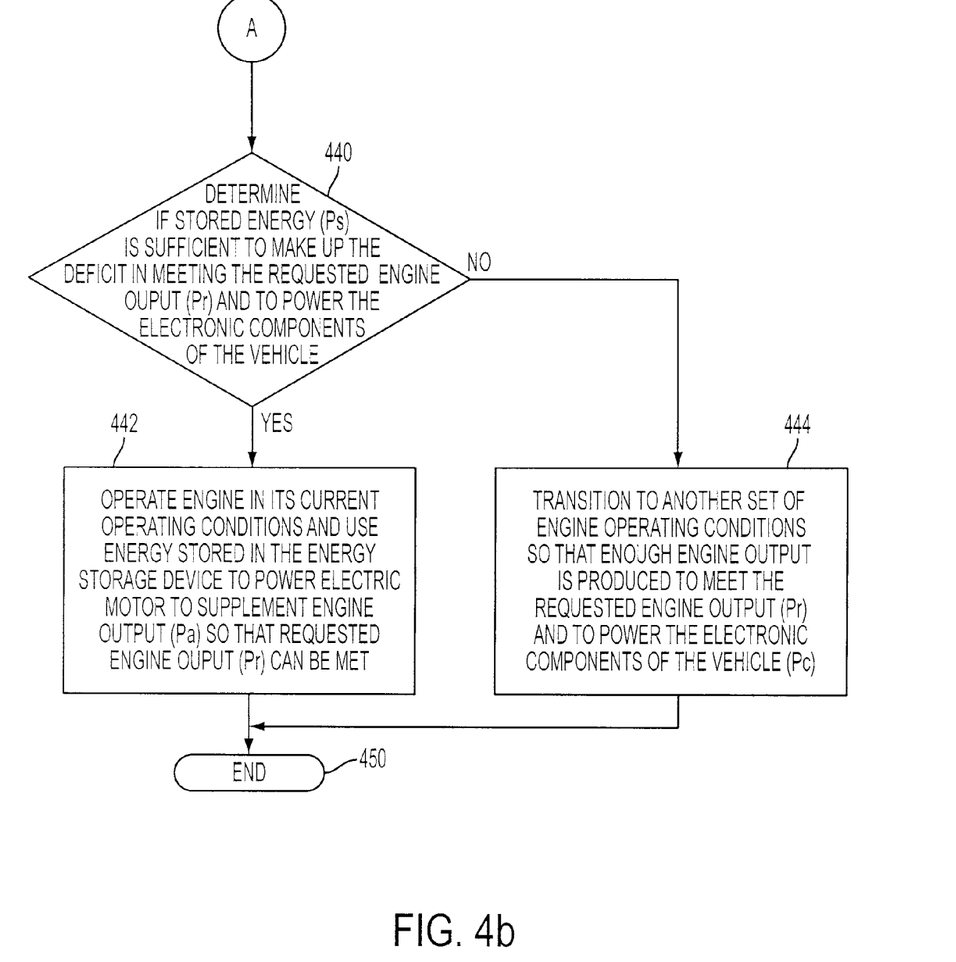
Figure 4C:
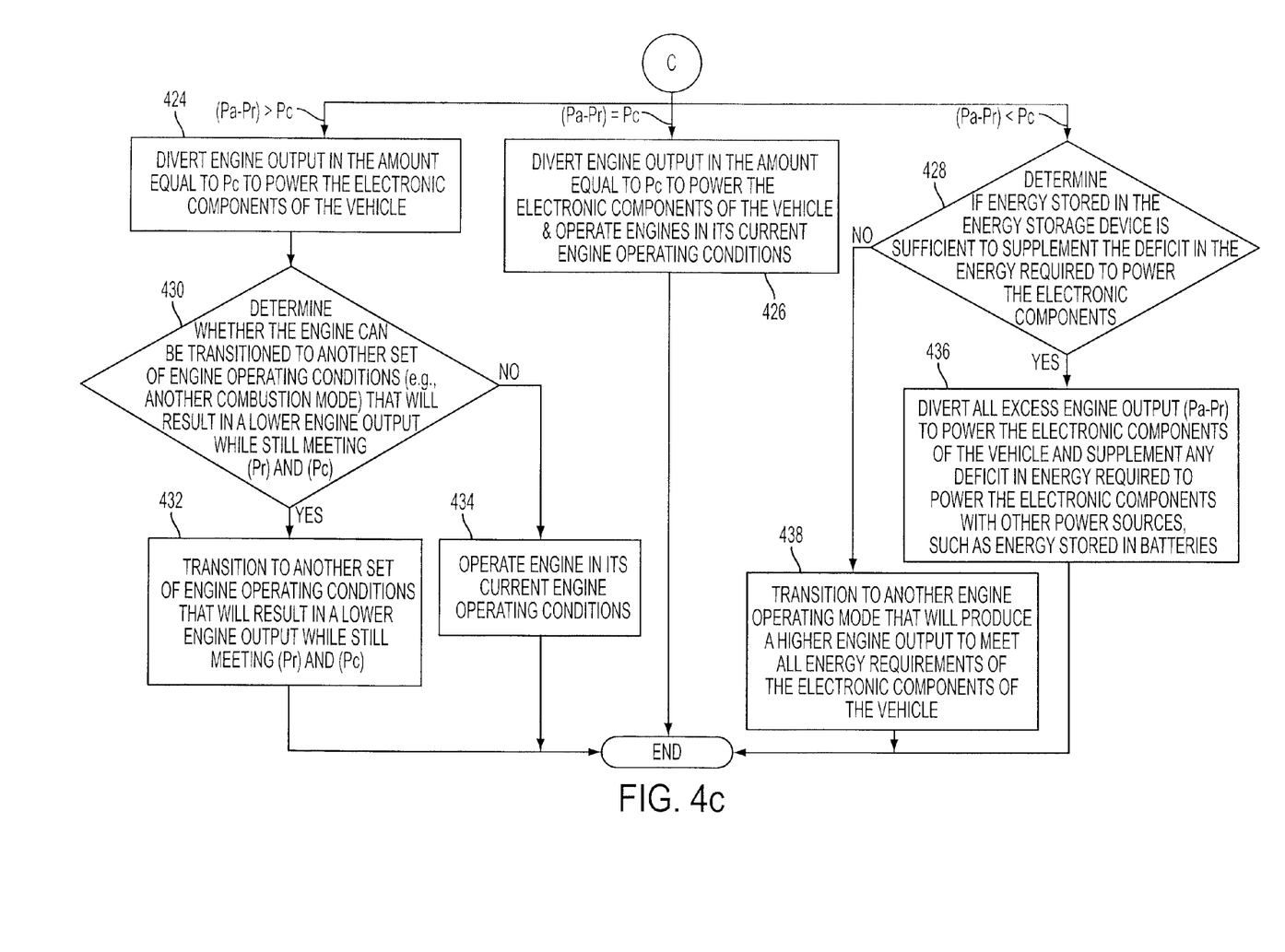

FIG. 4 is an example routine for coordinating engine operations, electric heaters for heating the intake air/charge, and energy storage devices.

In this embodiment, requested engine output (Pr), energy required to power electronic components of the vehicle (Pc), and energy stored in the energy storage device (Ps) are determined at 402. The requested engine output (Pr) may include but is not limited to a requested torque, speed and/or power, and may be determined by or correlated to pedal positions, other vehicle operating conditions, or inputs from the driver and/or a control unit that controls engine operation. The energy required to power electronic components of the vehicle (Pc) includes for example, but is not limited to, energy required to power the electric heaters (FIG. 1 106 and FIG. 2 232*a-d*) and energy required to power the passenger compartment air conditioning system. The energy stored in the energy storage device (Ps) may be determined based on various sensors. For example if the energy storage device is composed of batteries, Ps may be determined based on, for example, signal inputs of various battery sensors, such as battery charge sensors for sensing battery charge states and battery temperature sensors for sensing battery temperatures.

Next, engine operating condition, such as engine mode, and actual engine output (Pa) are determined at 404. Engine operating condition may be based on various factors, for example driver input, engine controller input, vehicle operating condition, and ambient conditions (see FIG. 3 step 304 for additional details of engine operating condition determination). Engine output (Pa) may be determined, for example, through fuel consumption measurements and/or engine speed measurements.

The routine then compares the requested output (Pr) with the actual engine output (Pa) at 406. If the requested output (Pr) is less than the actual engine output (Pr<Pa), the routine proceeds to 408. If the requested output (Pr) is greater than the actual engine output (Pr>Pa), the routine proceeds to 410. If the requested output (Pr) is equal to the actual engine output (Pr=Pa), the routine proceeds to 412.

If Pr<Pa, the routine determines whether energy storage is available (e.g., Batteries 236 of FIG. 2) at 408. For example, if the energy storage device is composed of batteries, the routine determines whether the batteries can be further charged. In some examples, this decision may be based on signal inputs of various battery sensors, such as battery charge sensors for sensing the charge state and battery temperature sensors. If energy storage is available, the routine proceeds to 414, but if no energy storage is available, the routine proceeds to 422.

If energy storage is available, the routine stores excess engine output (Pa−Pr) in the energy storage device at 414. The routine next determines whether power requirements of the electronic components (Pc) of the vehicle can be met by the energy stored in the energy storage device (Ps) and by the current engine output (Pa) at 416. If the answer is yes, then the routine operates the engine in its current operating condition and uses the power from the energy storage device to power the electronic components of the vehicle at 418. If the answer to the question posed at 416 is no, the routine transitions the engine to another set of engine operating conditions that will result in an increased engine output at 420.

If no energy storage is available, the routine compares the excess engine output (Pa−Pr) with the energy required to power the electronic components of the vehicle (Pc) at 422. If (Pa−Pr)>Pc, the routine proceeds to 424; if (Pa−Pr)=Pc, the routine proceeds to 426; if (Pa−Pr)<Pc, the routine proceeds to 428.

If (Pa−Pr)>Pc, the routine diverts engine output in the amount equal to Pc to power the electronic components of the vehicle. The routine then determines whether the engine can be transitioned to another set of engine operating conditions (e.g., another combustion mode) that will result in a lower engine output while still meeting the requested engine output (Pr) at 430. If the answer is yes, the routine transitions the engine to another set of engine operating conditions that will result in a lower engine output while still meeting the requested engine output (Pr) and energy required to power electronic components of the vehicle (Pc) at 432. If the answer is no to the question posed at 430, the routine operates engine in its current operating conditions at 434.

If (Pa−Pr)=Pc, the routine diverts engine output in the amount equal to Pc to power the electronic components of the vehicle and operates engine in its current operating conditions at 426.

If (Pa−Pr)<Pc, the routine then determines if energy stored in the energy storage device (Ps) is sufficient to supplement the deficit in the energy required to power the electronic components, that is whether Ps≧(Pc−(Pa−Pr)) at 428. If the answer is yes, the routine diverts all excess engine output (Pa−Pr) to power the electronic components of the vehicle and supplement any deficit in energy required to power the electronic components with other power sources, such as energy stored in batteries at 436. If the answer is no to the question posed at 428, the routine transitions the engine to another engine operating mode that will produce a higher engine output to meet all the energy requirements of the electronic components of the vehicle at 438.

If Pr>Pa at 406, the routine then determines whether the stored energy (Ps) stored in the energy storage device is sufficient to make up the deficit (Pr−Pa) in meeting the requested engine output and is sufficient to power the electronic components of the vehicle, that is whether Ps≧(Pr−Pa)+Pc at 440. If the answer is yes, the routine operates engine in its current operating conditions and uses energy stored in the energy storage device to power electric motor to supplement engine output (Pa) so that the requested engine output (Pr) and the power requirement of the electronic components (Pc) can be met. If the answer is no, the routine transitions the engine to another set of engine operating conditions so that enough engine output will be produced to power the electronic components of the vehicle at 444.

If Pr=Pa at 406, the routine then determines if energy stored in the energy storage device is available to meet the energy required to power electronic components of the vehicle (Pc) at 412. If the answer is yes, the routine operates the engine in its current operating conditions and uses the energy stored in the energy storage device to meet Pc at 448.

FIG. 5 is an example engine operation map for a four cylinder HCCI-electric hybrid engine that is also capable of SI combustion and variable engine displacement. The engine map may be stored in a control unit (e.g. 118 of FIG. 1. and 250 of FIG. 2) and the control unit may control the operation of an engine based on the engine map.

In this example engine map, engine load is plotted against engine speed as revolutions per minute (RPM). The engine operating region is shown to be contained below the wide open throttle (WOT) curve. The HCCI region is shown centrally located within the engine operating region and the SI region is shown occupying the higher load regions and the lower load regions surrounding the HCCI region. The HCCI region is shown limited by an upper output threshold and a lower output threshold. The map also shows variable engine displacement curves (0-cylinder, 1-cylinder, 2-cylinder, 3-cylinder, 4-cylinder curves). The variable engine displacement curves together with the WOT curve define the variable engine displacement regions. To be more specific, the 4-cylinder curve, and the 3-cylinder curve sandwich a 4-cylinder operating region where all four cylinders are in operation; the 3-cylinder, and the 2-cylinder curves sandwich a 3-cylinder operating region where three cylinders are in operation; the 2-cylinder and the 1-cylinder curves sandwich a 2-cylinder operating region where two cylinders are in operation; the 1-cylinder and the 0-cylinder curves sandwich a 0-cylinder operating region where one cylinder is in operation; and below the 0-cylinder curve all cylinders are deactivated and driving force is supplied by secondary sources, such as an electric motor powered by a energy storage device (e.g. 112 of FIG. 1 and 236 of FIG. 2).

It should be appreciated that FIG. 5 is just an example engine map and other engine map configurations are possible. It should be understood that the boundary of each operating region may differ substantially depending on, for example, engine configurations and/or engine operating conditions and/or driver specified parameters. While in this example, engine cylinders are capable of operating in other modes as noted herein. It should also be appreciated that this example map is merely an illustration; in reality, engine maps may be more complex and include more parameters. In some examples, the engine map may be optimized for a given vehicle and/or engine configuration, driver, and/or drive condition. In some examples, the engine map may be continually optimized updated while the vehicle is in operation. In some examples, the engine map optimization may be achieved through one or more algorithms.

The engine may transition from one operating mode to another based on the engine map. For example, as the requested wheel output decreases, the engine load may decrease such that the engine approaches the lower limit of the HCCI region. As engine load is further decreased, the engine may transition from HCCI mode to SI mode as the engine load becomes less than the lower HCCI threshold, so that reliable combustion may be achieved. Likewise, the engine may transition from SI mode to HCCI mode as the engine load again increases above the lower HCCI threshold.

Cylinders may be deactivated through various mechanisms, for example by stopping fuel delivery to the cylinders for one or more engine cycles, or by manipulating timing for opening and/or closing of engine cylinder intake and/or exhaust valves. Deactivation of a cylinder may also include the method of continuing to operate one or more valves of the cylinder (i.e. continuing to allow air to flow through the cylinder) and/or stopping one or more valves of the cylinder in an open configuration (i.e. continuing to allow air to flow through the cylinder) or closed configuration (i.e. reducing the airflow through the cylinder).

During transitions between combustion modes, engine operating conditions may be adjusted as needed so that combustion is achieved in the desired mode. Engine operating conditions that may need to be adjusted may include but are not limited to intake air temperature, ambient conditions, EGR contributions, turbocharging or supercharging conditions, valve timing, the number of cylinders activated/deactivated, the driver requested output, the condition of the energy storage device, the condition of the lean NOx trap, engine temperature, and/or fuel injection timing among others. For example, a transition from SI mode to HCCI mode may include increasing the temperature of the intake air entering the combustion chamber to achieve auto-ignition of the air and fuel mixture. Likewise, a transition from HCCI mode to SI mode may require decreasing the intake air temperature to reduce or prevent engine knocking.

However, transitions between combustion modes may be difficult under some conditions. Thus, it may be desirable to reduce transitions between combustion modes. An engine configured in a hybrid propulsion system as described above with reference to FIG. 1 and 2 may be configured to reduce the frequency of transitions between combustion modes and/or between the number of cylinders active or deactivated. In some examples, an energy storage device (e.g. batteries) may be used to absorb excess output produced by the engine rather than transitioning the engine to another operating mode. In some examples, the excess engine output may be diverted to power electric heaters (e.g. 106 of FIG. 1 and 232*a-d* of FIG. 2) for heating the intake air/charge. In some examples, the excess engine output may be diverted to power other electronic components of a vehicle, such as engine cooling fan, passenger compartment air conditioning system, etc.

For example, a first portion of the engine output may be delivered to the drive wheels to produce a wheel output and a second portion of the engine output may be absorbed by an energy storage device such as a battery. In this manner, the engine may operate in a HCCI mode when the wheel output is less than the lower HCCI threshold. Likewise, when wheel output is greater than an upper HCCI threshold, an electric motor (e.g. 108 of FIG. 1 and 228 of FIG. 2) may be used to provide a supplemental output so that the engine output may remain below the upper HCCI threshold. Therefore, the engine may continue operating in HCCI mode as long as a sufficient amount of stored energy is available to operate the motor to produce the additional wheel output.

As described herein, the term "output" may refer to a torque, a power, and/or a speed.

Figure 6:
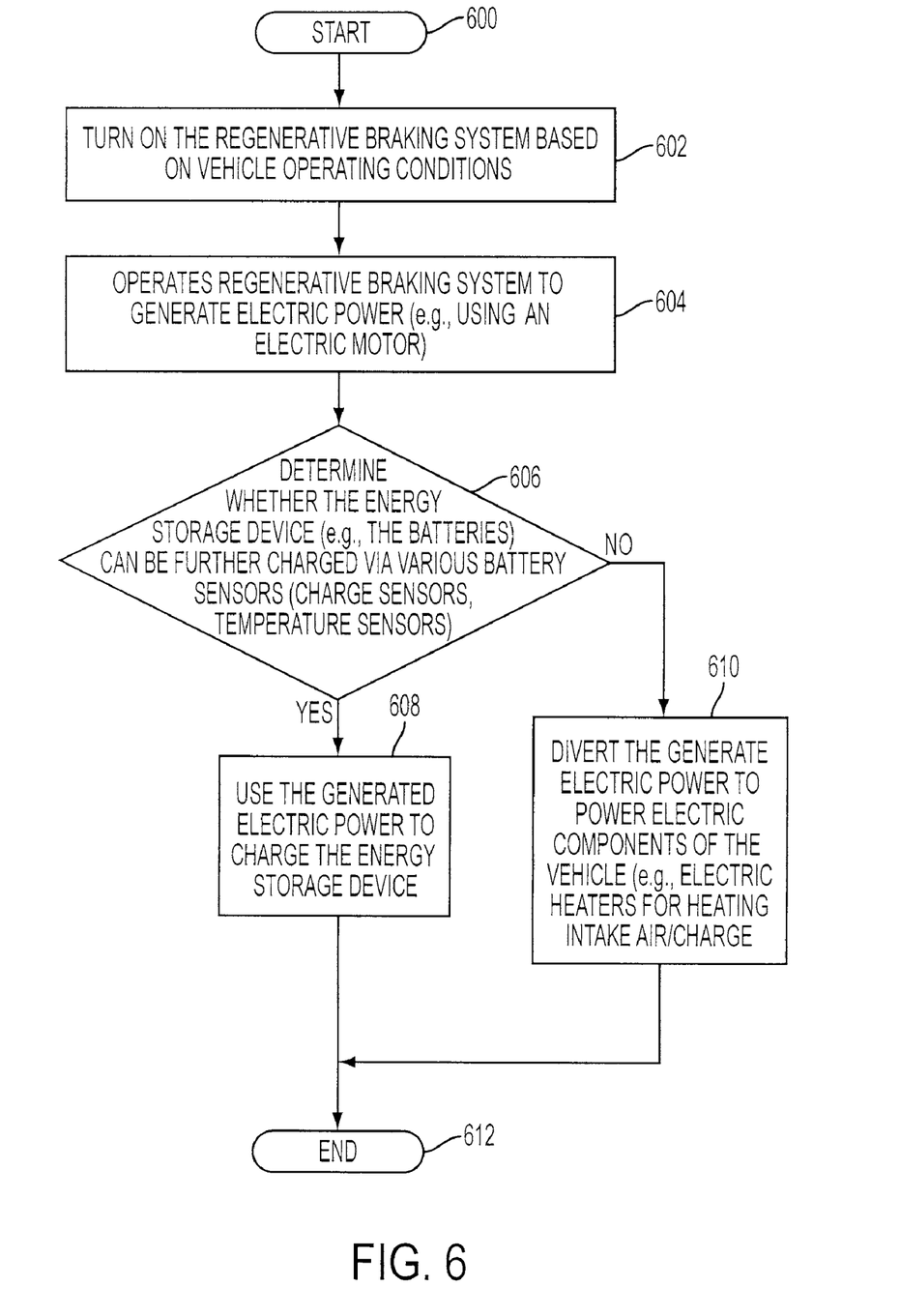
FIG. 6 is an example routine controlling the flow of electric power generated by the regenerative braking system during regenerative braking.

FIG. 6 is an example routine for controlling the flow of the electric power generated by the regenerative braking system. The routine first turns on the regenerative braking system based on vehicle operating conditions at 602. For example, the control unit senses that driver is braking the vehicle and turns on the regenerative braking system. Next, the routine operates the regenerative braking system to generate electric power, using an electric motor (e.g. 108 of FIG. 1 and 228 of FIG. 2) at 604. The routine then determines whether the energy storage device can be further charged based on sensed signal inputs from various sensors in the energy storage device at 606. If the answer is yes, the routine uses the electric power generated by the regenerative braking system to charge the energy storage device at 608. If the answer is no, the routine diverts the generated electric power to power electric components of the vehicle (e.g., electric heaters for heating intake air/charge) at 610.

Figure 7:
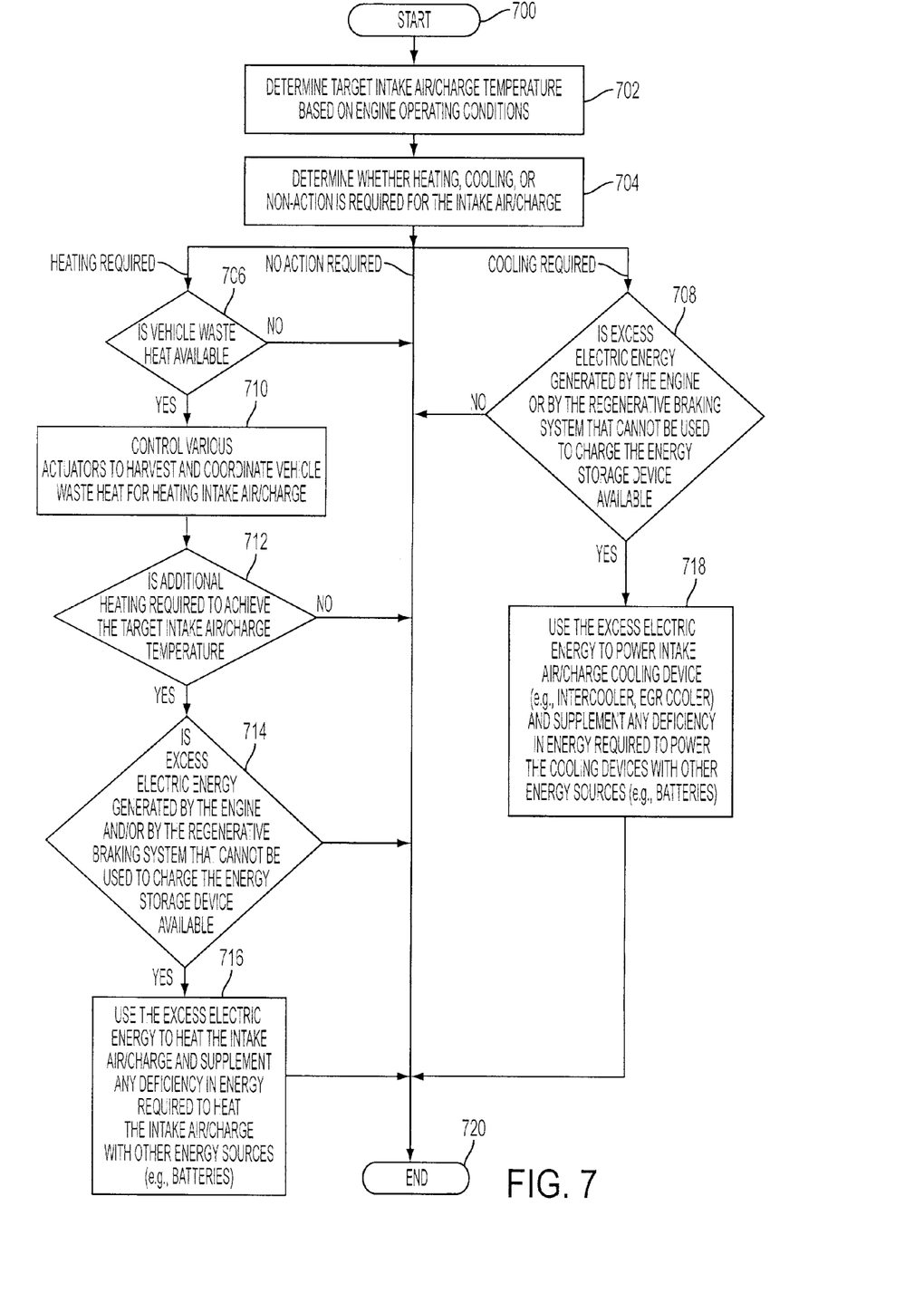
FIG. 7 is a flowchart showing an example routine for coordinating various energy sources for heating the intake air/charge.

FIG. 7 is an example routine that ensures that waste vehicle thermal energy and excess electric power generated by the engine or by the regenerative braking system, are used first by the intake thermal management system for adjusting the intake air/charge temperature before being used for other purposes, such as heating passenger compartment or powering other electronics.

At 702, the routine determines target intake air/charge temperature based on engine operating conditions.

At 704, the routine then determines whether heating, cooling or non-action is required for the intake air/charge. If heating is required, the routine proceeds to 706; if no action is required, the routine ends; and if cooling is required, the routine proceeds to 708.

If heating is required at 704, the routine then determines whether vehicle waste heat is available. If the answer is no, the routine ends; if the answer is yes, the routine controls various actuators (e.g.122) to harvest and coordinate vehicle waste heat for heating intake air/charge at 710. The routine then determines whether additional heating is still required to achieve the target intake air/charge temperature at 712. If the answer is no, the routine ends; but if the answer is yes, the routine then determines whether excess electric power generated by the engine and/or by the regenerative braking system that cannot be used to charge the energy storage device is available at 714. If the answer is no, the routine ends; if the answer is yes, the routine uses the excess electric power to heat the intake air/charge and supplement any deficiency in energy required to heat the intake air/charge with other energy sources (batteries) at 716.

If cooling is required at 706, the routine determines whether excess electric power generated by the engine or by the regenerative braking system that cannot be used to charge the energy storage device is available. If the answer is no, the routine ends; if the answer is yes, the routine uses the excess electric power to power the intake air/charge cooling devices (e.g., intercooler, EGR cooler) and supplement any deficiency in energy required to power the cooling devices with other energy sources (e.g. batteries) at 718.

Figure 8:
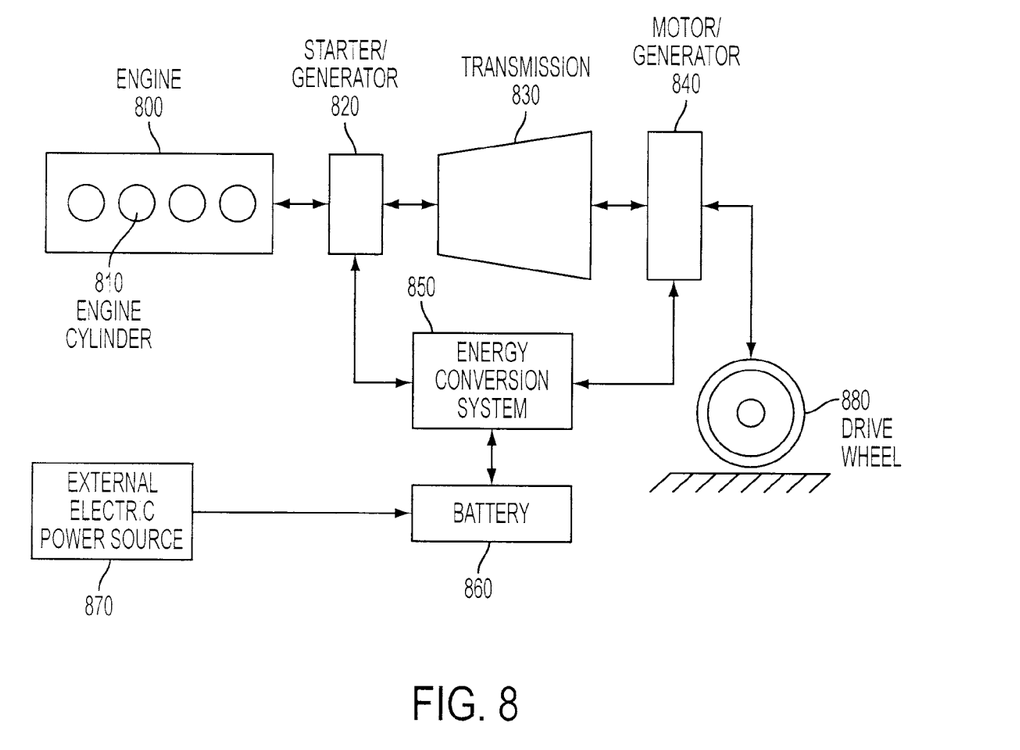
FIG. 8 is a diagram illustrating an example parallel HCCI-electric hybrid engine.

FIG. 8 is a diagram illustrating an example parallel HCCI-electric hybrid drive system that may be used according to the present application. The drive system is shown to include two power sources for powering the vehicle, an engine 800 and a battery 860 arranged in a parallel with respect to each other. The engine 800 with multiple engine cylinders 810 is coupled to a starter/generator 820, which is coupled to a transmission 830, which is further coupled to an electric motor 840 for powering a set of drive wheel 880. The starter/generator 820 may be coupled to a battery 860 through an energy conversion device 850. The battery 860 is coupled to the motor/generator 840 to power the drive wheels 880 through the energy conversion system 850. An external power source 870 may be coupled to and charge the battery, and such a configuration may be referred to as a plug-in hybrid system.

Figure 9:
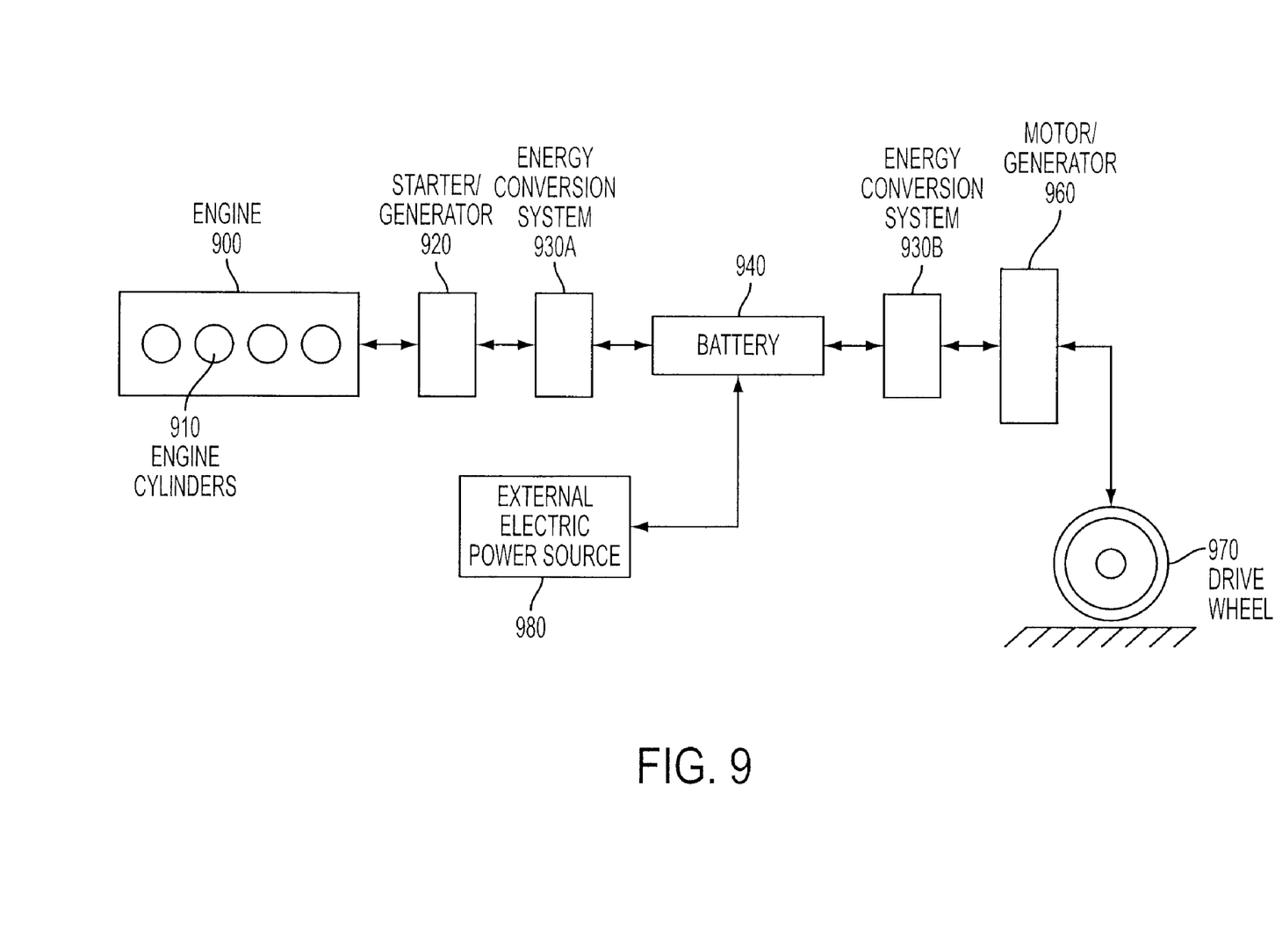
FIG. 9 is a diagram illustrating an example series HCCI-electric hybrid engine.

FIG. 9 is a diagram illustrating an example series HCCI-electric hybrid drive system that may be used according to the present application. The drive system is shown to include a single power source for powering the vehicle, a battery 940. An engine 900 with multiple engine cylinders 910 is coupled to a starter/generator 920. The starter/generator 920 is coupled to the battery 940 through an energy conversion system 930A. The battery 940 is in turn coupled to a motor/generator for powering a set of drive wheels 970 through an energy conversion system 930B. The battery 940 may be further coupled to and charged by an external electric power source 980, for example when the vehicle is parked.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method of operating an internal combustion engine coupled in a hybrid powertrain, comprising:
   extracting thermal and electrical waste energy from components of an electrical power system of the hybrid powertrain; and
   during HCCI operation:
      adjusting intake air temperature of the engine by coordinating said waste energy extraction, the coordination including, when a battery is fully charged, first using the extracted electrical waste energy to power an electrical heater in an engine intake.

2. The method according to claim 1 wherein said components comprise an energy conversion device.

3. The method according to claim 1 wherein said components comprise an energy storage device.

4. The method according to claim 1 wherein said components comprise an electrical generator.

5. The method according to claim 1 wherein said components comprise a regenerative braking system.

6. The method according to claim 1 wherein said components comprise an engine electrical power generating system.

7. The method according to claim 1 wherein said coordinating further comprising coordinating the waste energy extraction and engine operation.

8. The method according to claim 1 wherein said extracting thermal and electrical waste energy from components of the electrical power system further comprises extracting excess electrical energy from an external plug-in.

9. An intake thermal management system for a hybrid charge compression ignition electric vehicle for adjusting engine intake air temperature, comprising:
   an electrical power system for a hybrid powertrain;
   a battery;
   an electrical heater for heating engine intake air;
   a heat exchanger device for extracting thermal waste energy of the electrical power system for heating the engine intake air;
   a regenerative braking system; and
   a control unit for coordinating, during HCCI operation, electrical and thermal waste energy extraction of the heat exchanger and the regenerative braking system, the coordination including, when the battery is fully charged, first using extracted electrical waste energy from the regenerative braking system to power the electrical heater.

10. The intake thermal management system according to claim 9, wherein the electrical heater is coupled to a device for generating electrical power from an engine output torque.

11. The intake thermal management system according to claim 9, wherein the electrical heater is coupled to a device for generating electrical power from regenerative braking.

12. The intake thermal management system according to claim 9 wherein the system further comprises a plug-in for charging the electrical power system.

* * * * *